United States Patent
Parhar et al.

(10) Patent No.: US 8,181,975 B2
(45) Date of Patent: May 22, 2012

(54) SCOOTER VEHICLE SYSTEM

(76) Inventors: Sarbjit Parhar, Mississauga (CA); Taj Parhar, Mississauga (CA); Kush Parhar, Mississauga (CA)

(*) Notice: Subject to any disclaimer, the term of this patent is extended or adjusted under 35 U.S.C. 154(b) by 360 days.

(21) Appl. No.: 12/322,978

(22) Filed: Feb. 10, 2009

(65) Prior Publication Data

US 2010/0201094 A1    Aug. 12, 2010

(51) Int. Cl.
*B62M 1/00* (2010.01)

(52) U.S. Cl. .................. 280/87.041; 280/209

(58) Field of Classification Search ........... 280/87.041, 280/209
See application file for complete search history.

(56) References Cited

U.S. PATENT DOCUMENTS

| | | | |
|---|---|---|---|
| 2,545,543 A | 3/1951 | Bottrill | |
| 2,971,769 A | 2/1961 | Gaddis | |
| 3,856,321 A | 12/1974 | Solymosi | |
| 4,363,495 A | 12/1982 | Henson | |
| 5,918,892 A | 7/1999 | Aaron et al. | |
| 6,095,274 A * | 8/2000 | Patmont | 180/181 |
| 6,808,187 B1 | 10/2004 | Harris | |
| 6,926,296 B1 * | 8/2005 | Harrington | 280/209 |
| 2003/0127821 A1 | 7/2003 | McCandless | |
| 2003/0221888 A1 * | 12/2003 | McKinney et al. | 180/181 |
| 2005/0156396 A1 | 7/2005 | Teng et al. | |

* cited by examiner

*Primary Examiner* — J. Allen Shriver, II
*Assistant Examiner* — Bryan Evans
(74) *Attorney, Agent, or Firm* — Hudak, Shunk & Farine Co. LPA

(57) ABSTRACT

A wheeled vehicle system for operation on a ground surface. The wheeled vehicle system includes a first wheeled vehicle and a second wheeled vehicle, each of which may be scooter-like vehicles. Each wheeled vehicle includes a frame, a rear wheel and a steerable front wheel rotatably mounted in a common plane on the frame to contact the ground surface, an elongate steering member extending generally upwardly from the frame for steering of the front wheel, the elongate steering member defining and rotatable about an axis of rotation. A handle member extends transversely from the elongate steering member for rotation of the elongate steering member. The handle member of the first wheeled vehicle is connected to the handle member of the second wheeled vehicle. An adapter system is also described which facilitates connection of the wheeled vehicles.

16 Claims, 10 Drawing Sheets

SCOOTER VEHICLE SYSTEM

This invention relates generally to wheeled vehicles. More particularly, this invention relates to scooters.

BACKGROUND

Conventional scooters typically have a front wheel and a rear wheel mounted in a common plane. In a conventional scooter a user rides with a front foot on a narrow and horizontally oriented footboard and the scooter is driven by stepping or kicking with the rear foot onto the ground. When enough drive is provided, the rear foot is rested on the footboard, typically behind the front foot. A steering mechanism is also typically mounted to the front wheel for steering of the front wheel of the scooter.

Some gas or electric scooters are also available which have a motor for driving the scooter. The motor of such scooters can replace or be used in cooperation with the manual drive provided by the rear foot of the user.

A difficulty arises as there are only two wheels mounted on a relatively narrow platform in the direction of travel, and thus the scooter may readily tip when in operation. This may be compounded by having to place one foot in front of the other. This may require additional balancing by the user, which can prove difficult or at least awkward.

Another difficulty occurs when steering the front wheel of the scooter. An amount of dexterity and coordination may be required while turning to prevent tipping over while turning. Similar dexterity and coordination issues may also arise in other vehicles such as bicycles, motorcycles, etc.

The above difficulties may especially arise with respect to those with limited or developing coordination, such as children and young people.

SUMMARY OF THE DISCLOSURE

It would be advantageous to provide a wheeled vehicle which addresses at least some of the above-noted difficulties.

The present application generally provides a wheeled vehicle system that includes a first wheeled vehicle and a second wheeled vehicle fixedly connected at the handle members.

In one aspect, there is provided a wheeled vehicle system for operation on a ground surface. The wheeled vehicle system includes a first wheeled vehicle and a second wheeled vehicle. The first wheeled vehicle includes a first frame, a first rear wheel and a first steerable front wheel rotatably mounted in a first common plane on the first frame to contact the ground surface, a first elongate steering member extending generally upwardly from the first frame for steering of the first front wheel, the first elongate steering member defining a first axis of rotation and rotatable about this first axis of rotation, a first handle member extending transversely from the first elongate steering member for rotation of the first elongate steering member. The second wheeled vehicle includes a second frame, a second rear wheel and a second steerable front wheel rotatably mounted in a second common plane on the second frame to contact the ground surface, a second elongate steering member extending generally upwardly from the second frame for steering of the second front wheel, the second elongate steering member defining a second axis of rotation and rotatable about this second axis of rotation, a second handle member extending transversely from the second elongate steering-member for rotation of the second elongate steering member. The first handle member of the first wheeled vehicle is fixedly connected to the second handle member of the second wheeled vehicle in order that the two handle members can be operated in unison to steer the vehicle system.

In another aspect, there is provided a first wheeled vehicle for connection to a second similar wheeled vehicle for operation on a ground surface, the first wheeled vehicle including a main vehicle frame, a rear wheel and a steerable front wheel rotatably mounted in a common plane on the main frame to contact the ground surface, an elongate steering member extending generally upwardly from the main frame for steering of the front wheel, the elongate steering member defining an axis of rotation and rotatable about this axis of rotation, a first handle member extending transversely from the elongate steering member for rotation of the elongate steering member. A connecting device is provided to rigidly connect the first handle member to an end section of a second handle member of the second similar wheeled vehicle so that the first and second handle members are axially aligned with one another. During use of the first and second vehicle together and at the same time, they are connected to each other by the connecting device and they are able to move and be steered together.

In another aspect, there is provided a vehicle system including a first vehicle having a first frame, a first steerable front support mechanism mounted on the first frame, a first elongate steering member extending generally upwardly from the first frame for steering of the first front support mechanism, the first elongate steering member defining a first axis of rotation and rotatable about the first axis of rotation, and a first handle member extending transversely from the first elongate steering member for rotation of the first elongate steering member. A second vehicle has a second frame, a second steerable front support mechanism mounted on the second frame, a second elongate steering member extending generally upwardly from the second frame for steering of the second front support mechanism, the second elongate steering member defining a second axis of rotation and rotatable about the second axis of rotation, and a second handle member extending transversely from the second elongate steering member for rotation of the second elongate steering member. The first handle member of the first vehicle is fixedly connected to the second handle member of the second vehicle so that, during use of the two vehicles together, they are able to be moved and to be steered together.

In another aspect, there is a connecting member having one end adapted for pivoting connection to the frame of the first wheeled vehicle and the other end adapted for pivoting connection to the frame of the second wheeled vehicle.

DESCRIPTION OF THE FIGURES

Embodiments will now be described by way of example with reference to the accompanying drawings, in which like reference numerals are used to indicate similar features, and in which.

DETAILED DESCRIPTION

Figure 1A:
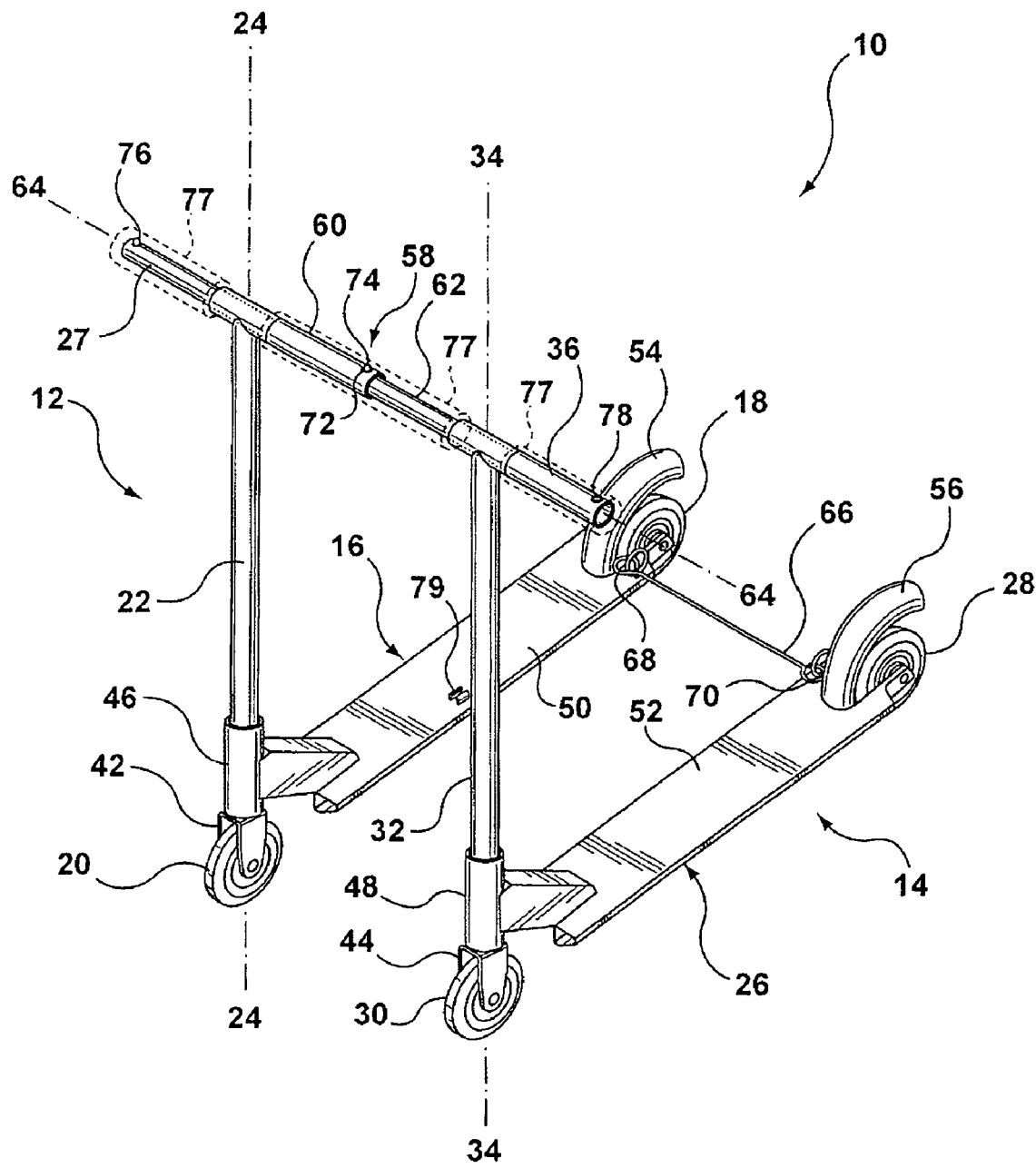
FIG. 1A shows an isometric view of a wheeled vehicle system in accordance with an example embodiment.
Figure 1B:
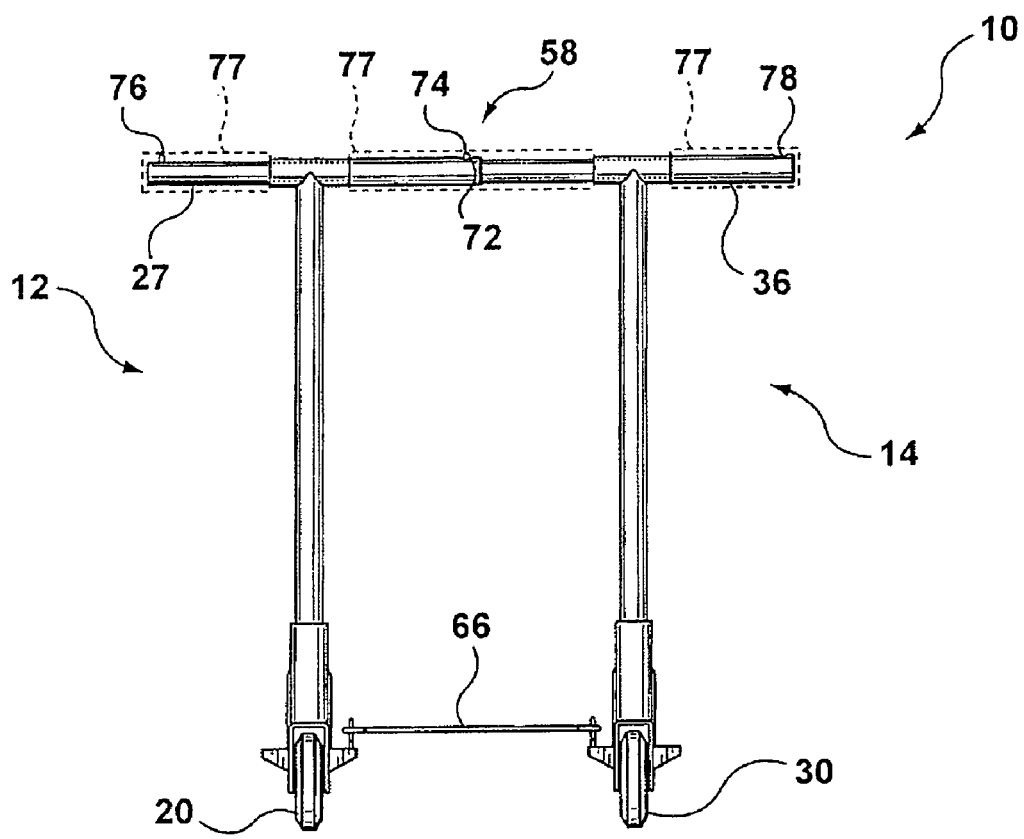
FIG. 1B shows a front view of the wheeled vehicle system of FIG. 1A.
Figure 1C:
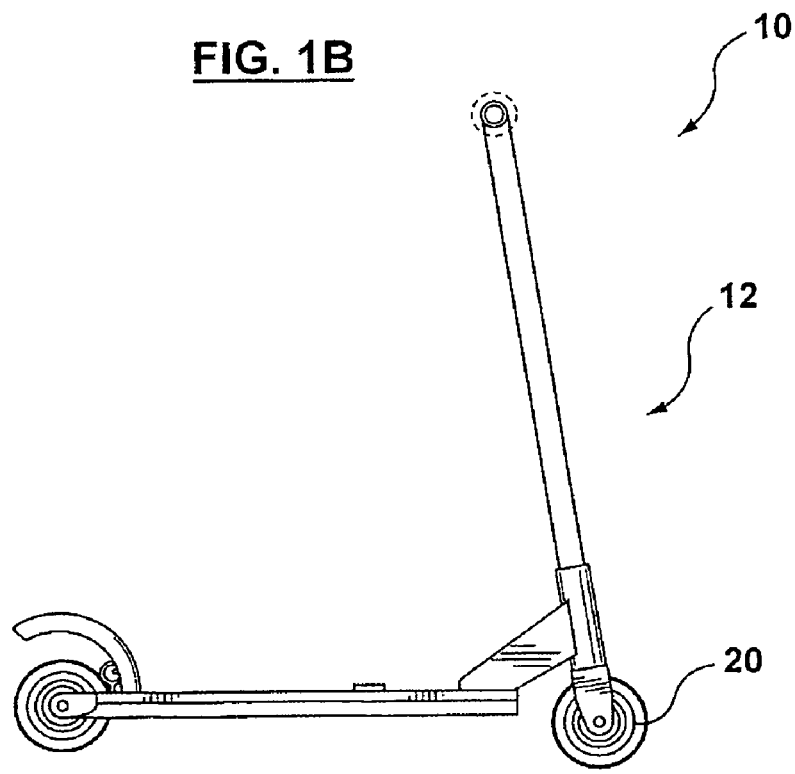
FIG. 1C shows a left side view of the wheeled vehicle system of FIG. 1A.

Reference is made to FIG. 1, which shows a wheeled vehicle system 10 for operation on a ground surface. Generally, the wheeled vehicle system includes a first wheeled vehicle 12 and a second wheeled vehicle 14 which are connected together, as further described below.

As shown, the first wheeled vehicle 12 may be a scooter-like vehicle. The first wheeled vehicle 12 includes a first frame 16, a first rear wheel 18 and a first steerable front wheel 20 which are rotatably mounted in a first common plane on the first frame 16 to contact the ground surface. The first wheeled vehicle 12 further includes a first elongate steering member 22 extending generally upwardly from the first frame 16 for steering of the first front wheel 20, the first elongate steering member 22 defining a first axis of rotation 24 and rotatable about this first axis of rotation 24. The first wheeled vehicle 12 further includes a first handle member 27 extending transversely from the first elongate steering member 22, for rotation of the first elongate steering member 22 about the first axis of rotation 24. Similarly, the second wheeled vehicle 14 includes a second frame 26, a second rear wheel 28 and a second steerable front wheel 30 rotatably mounted in a second common plane on the second frame 26 to contact the ground surface. A second elongate steering member 32 extends generally upwardly from the second frame 26 for steering of the second front wheel 20, the second elongate steering member 32 defining a second axis of rotation 34 and rotatable about the second axis of rotation 34. A second handle member 36 extends transversely from the second elongate steering member 32 for rotation of the second elongate steering member 32 about the second axis of rotation 34.

Generally, in accordance with an exemplary embodiment, each of the ends of the handle members 27, 36 are fixedly connected to each other at connection 58. Being fixedly connected includes a rigid connection which does not allow the two handle members 27, 36 to pivot or rotate relative to each other when in use.

Still referring to FIG. 1, the front wheel 20 and the rear wheel 18 are generally of the same size. The front wheel 20 is mounted in a u-bracket 42, which is connected to an upright sleeve in which is rigidly received the steering member 22. The first wheeled vehicle 12 further includes a generally horizontal footboard 50 for supporting of a user standing generally upright. The front end of the footboard 50 is connected to the sleeve 46. The rear end of the footboard 50 has the rear wheel 18 mounted thereon, which optionally may be covered by a splash guard 54.

A similar configuration is shown with respect to the second wheeled vehicle 14, which shows the front wheel 30 rotatably mounted in a u-bracket 44, which is connected to an upright sleeve 48 in which is rigidly received the steering member 32. The second wheeled vehicle 14 further includes a generally horizontal footboard 52 for supporting of a user standing generally upright. The front end of the footboard 52 is connected to the sleeve 48. The rear end of the footboard 52 has the rear wheel 28 rotatably mounted thereon, which may be covered by a splash guard 56. Thus, for example, the footboard 50 of the first wheeled vehicle 12 can support a right foot and the footboard 52 of the second wheeled vehicle 14 can support a left foot of a user.

The connection 58 can be accomplished in a variety of ways. In the embodiment illustrated in FIG. 1, one section 60 of the first handle member 27 is hollow and has a larger inner diameter than an outer diameter of a section 62 of the second handle member. The section 60 of first handle member 27 has an open end and a transverse hole 72. The handle section 62 includes a spring loaded plunger 74 which can be inserted into the transverse hole 72. In this way, an end of the second section 62 of second wheeled vehicle 14 can be inserted into the open end of the section 60 by depressing the spring loaded plunger 74, and allowing the spring loaded plunger 74 to extend into the hole 72. The connection 58 may also be maintained by a variety of additional ways, including friction, screw and thread connections, further fasteners (such as transverse pins or screws), and the like. The combined handle members 27, 36 thereby define a common axis 64 when connected together, and can form a single handlebar when combined. As shown, the first handle member 27 can also include a spring loaded plunger 76, while the second handle member 36 can include a transverse hole 78 at its end furthest from the plunger 74. This for example allows for reversing the positions of the wheeled vehicles 12, 14, or for cascading additional similar wheeled vehicles.

As shown in dash lines, additional handle covers 77, which may for example be formed of foam, rubber or plastic, can be used to circumscribe the handle members 27, 36 in a manner known per se for a standard scooter.

Referring still to FIG. 1, there is provided a detachable rear connecting member 66, which is pivotally connected to the frames 16, 26. The connecting member 66 is illustrated with the connection being close to the rear wheels 18, 28. However, it is possible for the connecting member 66 to be at a different location, for example in a more forward position, or anywhere on the frames 16, 26. The connecting member 66 includes loop connectors 68, 70 for connection to corresponding attachment loops connected to respective frames 16, 26, or to attachment holes in the frames, thereby creating the pivoting connection. In some embodiments, the connecting member 66 is rigid being formed of a rigid material such as a steel wire or rod. In other embodiments, the connecting member 66 only controls the maximum distance between the two frames and is not rigid. An example of such a connecting member is a cable.

Generally, the connecting member 66 prevents the wheeled vehicles 12, 14 from flaring or moving apart while turning of the system 10. The length of the connecting member 66 is generally configured to be the same length as the distance between the steering members 22, 32 (to create a generally rectilinear vehicle). Additional connecting members similar to connecting member 66 may be provided to effect additional connections between the frames 16, 26. Note, however, that the system 10 may still be operable by detaching the connecting member 66 (or by merely operating the system 10 without the connecting member 66 in the first place). For example, an advanced rider may not need the added stability provided by the connecting member 66. This additional flexibility may for example allow the advanced rider to perform additional tricks and stunts.

The wheeled vehicle system 10 can be assembled in the above-described manner, and may similarly be disassembled into the original components. Thus, each wheeled vehicle 12, 14 may still be individually operable when separated. Further, each wheeled vehicle 12, 14 may be further disassembled/reassembled by removing the handle members 27, 36 from the t-shaped steering members 22, 32, respectively. In other embodiments (not shown), the one section 60 is separate from the handle member 27, both of which may be inserted into opposite ends of the t-shaped steering member 22. Such assemblies may be facilitated by a connection mechanism such as another spring loaded plunger and corresponding hole configuration.

Referring to FIG. 1A, in some example embodiments a clasp 79 is provided for nesting of the connecting member 66 when the scooter vehicles 12, 14 are detached. As shown, the clasp 79 can be two resilient plastic members which receive the connecting member 66, by rotating the connecting member 66 by ninety degrees about loop connector 68.

Figure 2A:
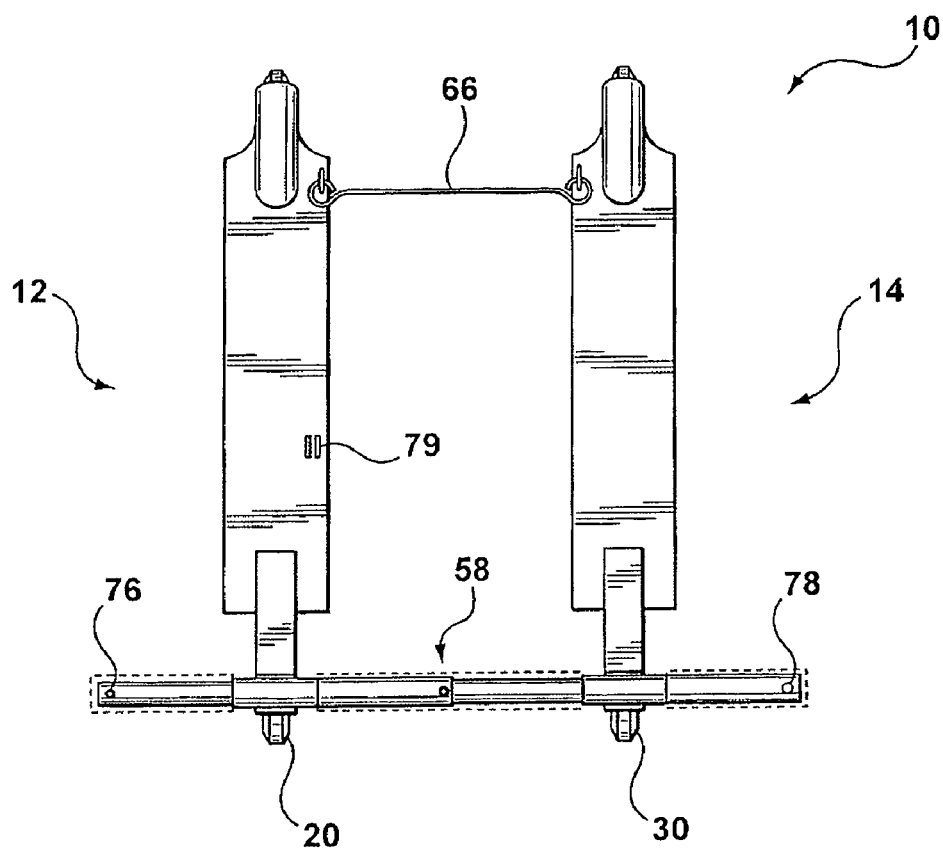
FIG. 2A shows a top view of the wheeled vehicle system of FIG. 1A in straight line operation.
Figure 2B:
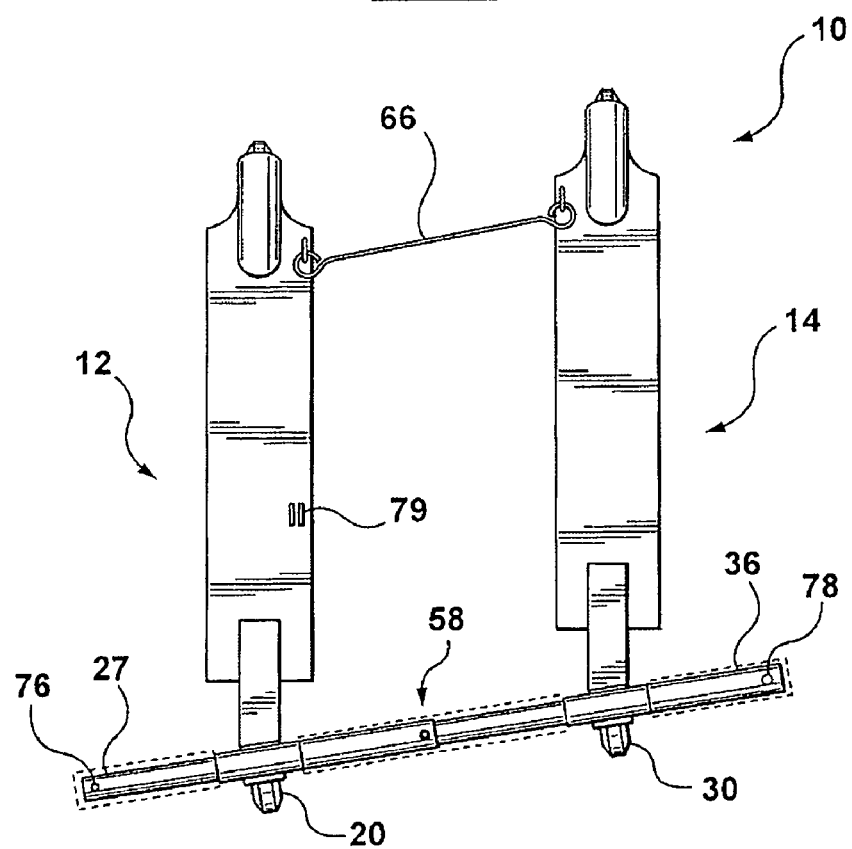
FIG. 2B shows a top view of the wheeled vehicle system of FIG. 1A in turning operation.

Reference is now made to FIGS. 2A and 2B, which illustrates the operation of the wheeled vehicle system 10. Referring to FIG. 2A, when moving in a straight line direction, for example moving forwards or backwards, the front wheels 20, 30 and all axes are generally rectilinear and directed in the straight line.

Reference is now made to FIG. 2B, which shows the wheeled vehicle system 10 in turning operation. The illustrated wheeled vehicle system 10 can be steered relatively easily by simply turning the combined handle members 27, 36, which will cause the two front wheels 20, 30 to pivot about their respective vertical axes 24, 34 (FIG. 1A) and it will also cause one wheeled vehicle 12, 14 to move forwardly relative to the other wheeled vehicle 12, 14. Two pivot axes are provided by the axes 24, 34 (FIG. 1A) and two pivot points are also defined by the pivoting connection between the connecting member 66 and the wheeled vehicles 12, 14. This generally creates a parallelogram-type shape when turning. This for example assists in easing steering of the wheeled vehicle system 10 into turns. This may also assist in performing slight turns, for example similar to "carving" when alpine skiing.

Figure 3:
FIG. 3 shows an isometric view of the wheeled vehicle system of FIG. 1A with a rider thereon.

Referring to FIG. 3, the wheeled vehicle system 10 may be operated by one person, as shown. In such embodiments, one foot would be placed on each footboard 50, 52. In other example embodiments, the wheeled vehicle system 10 may be operated by at least two people, for example one person on each wheeled vehicle 12, 14. This type of operation may for example be particularly enjoyable for children or young people.

In other example embodiments, the wheeled vehicle systems may be used as a trolley for transport of materials, including lightweight materials.

Figure 4A:
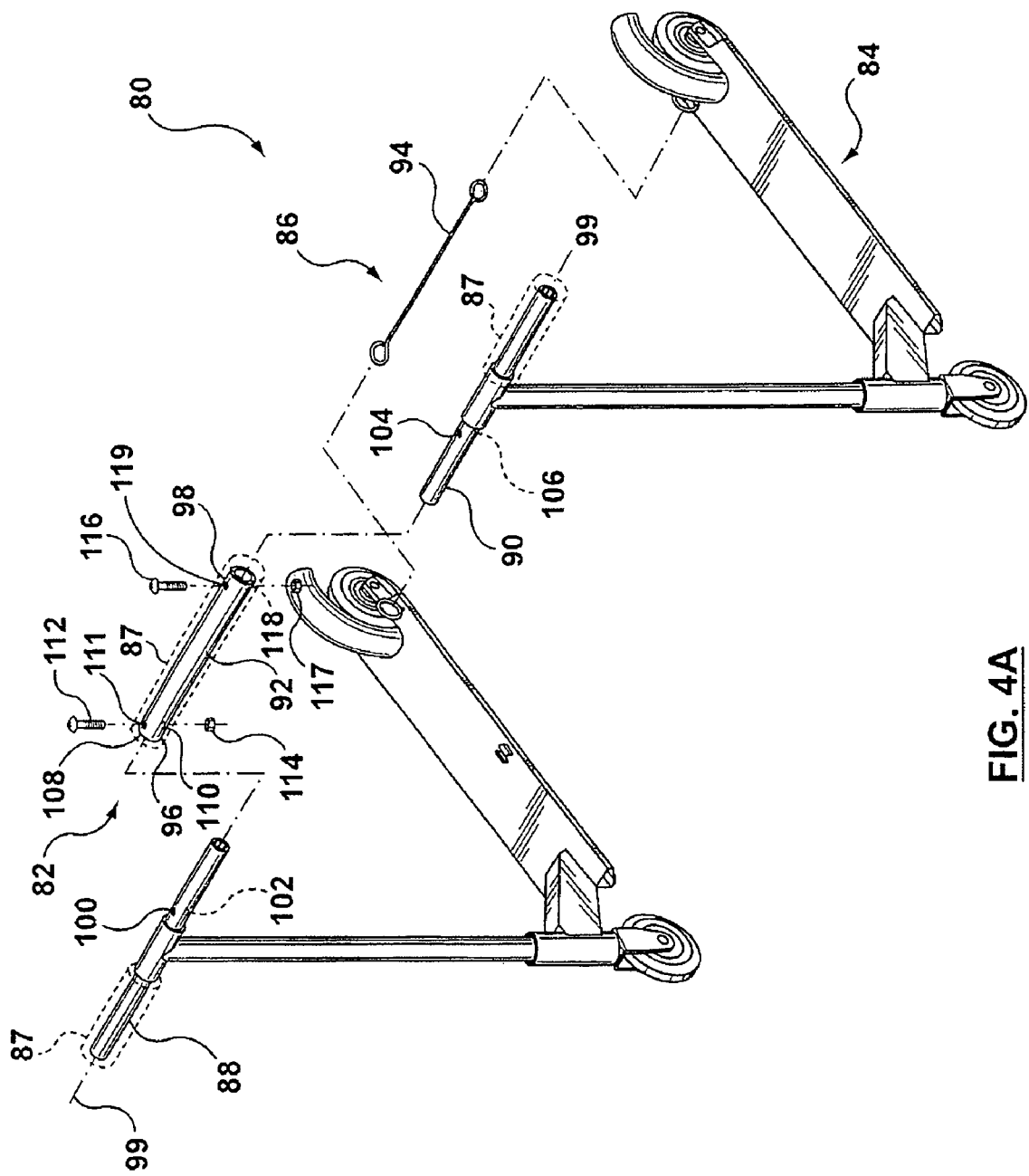
FIG. 4A shows an exploded isometric view of a wheeled vehicle system having an adapter in accordance with another example embodiment.
Figure 4B:
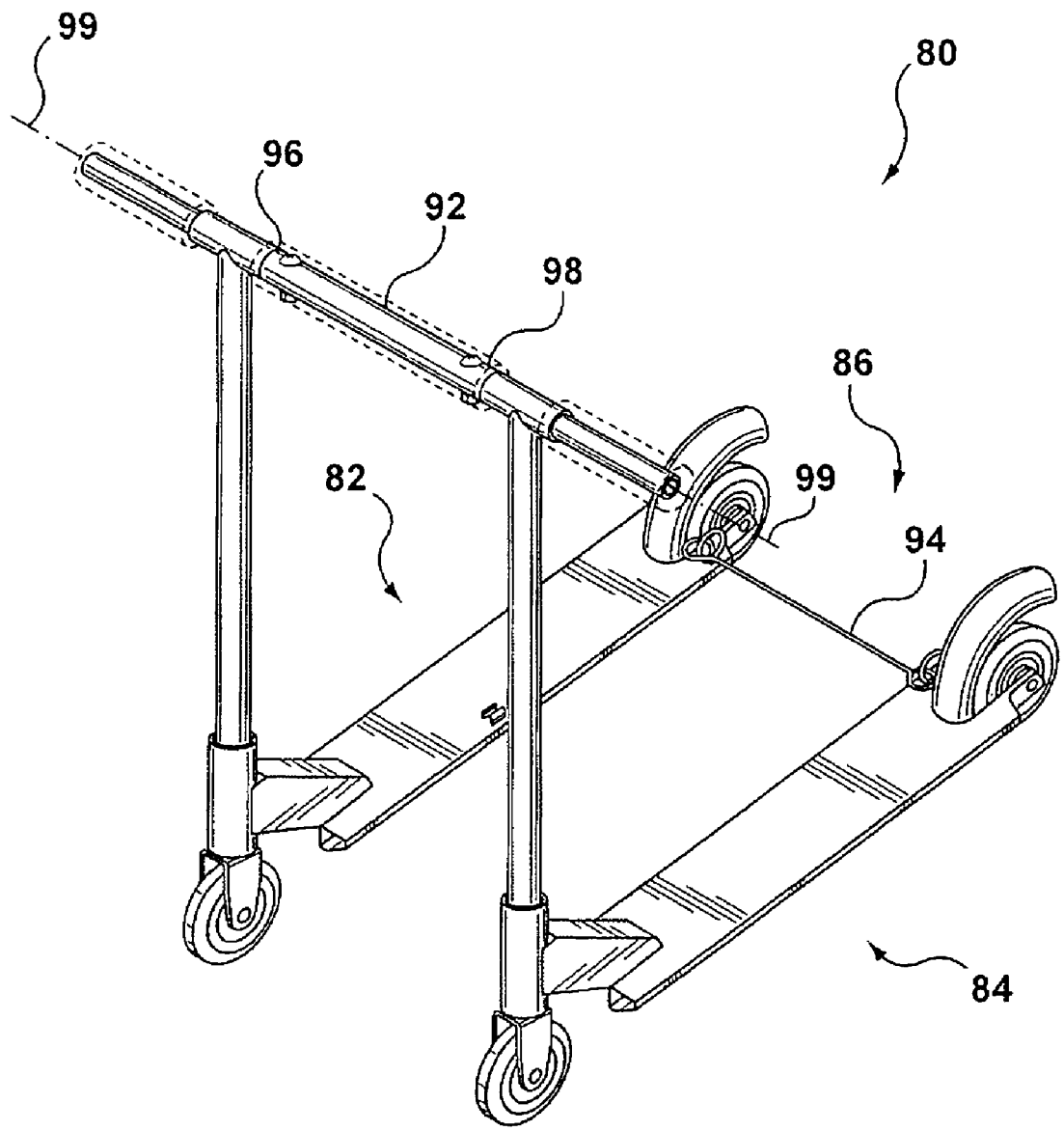
FIG. 4B shows an assembled isometric view of the wheeled vehicle system of FIG. 4A.

Reference is now made to FIGS. 4A and 4B, which shows a wheeled vehicle system 80 in accordance with another example embodiment. The wheeled vehicle system 80 includes first wheeled vehicle 82, second wheeled vehicle 84, and an adapter system 86 for connecting the first wheeled vehicle 82 to the second wheeled vehicle 84. The wheeled vehicles 82, 84 have generally the same features as the above-described wheeled vehicles 12, 14 of FIG. 1. First wheeled vehicle 82 includes first handle member 88, while second wheeled vehicle 84 includes second handle member 90. The first handle member 88 includes transverse holes 100, 102 which are diametrically opposed. Similarly, the second handle member 90 includes transverse holes 104, 106 which are diametrically opposed. The adapter system 64 includes a rigid adapter 92 and a rear connecting member 94. The rigid adapter 92 includes first end 96 and second end 98. The first end 96 is adapted for fixedly connecting to the first handle member 88 of the first wheeled vehicle 82, while the second end 98 is adapted for fixedly connecting to the handle member 90 of the second wheeled vehicle 84. At the first end 96 is located diametrically opposite transverse holes 110, 111 while at the second end 98 is located additional diametrically opposite transverse holes 118, 119. When assembled, as shown in FIG. 4B, the diametrically opposite transverse holes 110, 111 line up with the holes 102, 100 in the first handle member 88, respectively. Similarly, the diametrically opposite transverse holes 118, 119 line up with the holes 106, 104 in the second handle member 90, respectively. A bolt 112 and nut 114 may be used to secure the holes between the first end 96 and the first handle member 88. Another bolt 116 and nut 117 may be used to secure the holes between the second end 98 and the second handle member 90. The rigid adapter 92 may be formed of a rigid material such as metal or plastic. The rear connecting member 94 is similar to the above-described rear connecting member 66 (FIG. 1), and operates in a similar fashion by pivotally connecting to the first and second wheeled vehicles 82, 84.

The rigid adapter 92 may be generally elongate, and as shown the rigid adapter 92, the first handle member 88, and the second handle member 90 may form a single handlebar. The rigid adapter 92 may for example be a hollow cylindrical tube which can circumscribe the diameters of the handle members 88, 90. In some example embodiments, the rigid adapter 92 may be adapted to connect to the handle members 88, 90 by a variety of ways, including friction, screw and thread connections, further fasteners (such as transverse pins or screws), and the like. Further, the rigid adapter 92, the first handle member 88, and the second handle member 90 may also define a common axis 99 when connected.

As shown, additional handle covers 87, which may for example be formed of foam, rubber or plastic, may be use to circumscribe the handle members 88, 90 as well as the adapter 92.

A kit of parts may also be provided which may include the adapter system 86, including the rigid adapter 92 and the connecting member 94, and may further include the wheeled vehicles 82, 84. The kit may include instructions on retrofitting existing wheeled vehicles by fixedly connecting the handle members of the wheeled vehicles.

In some example embodiments, only one wheeled vehicle is provided for connection to a similar wheeled vehicle, wherein a first handle member of the one wheeled vehicle is adapted for fixedly connecting to a second handle member of the second similar wheeled vehicle.

Figure 5A:
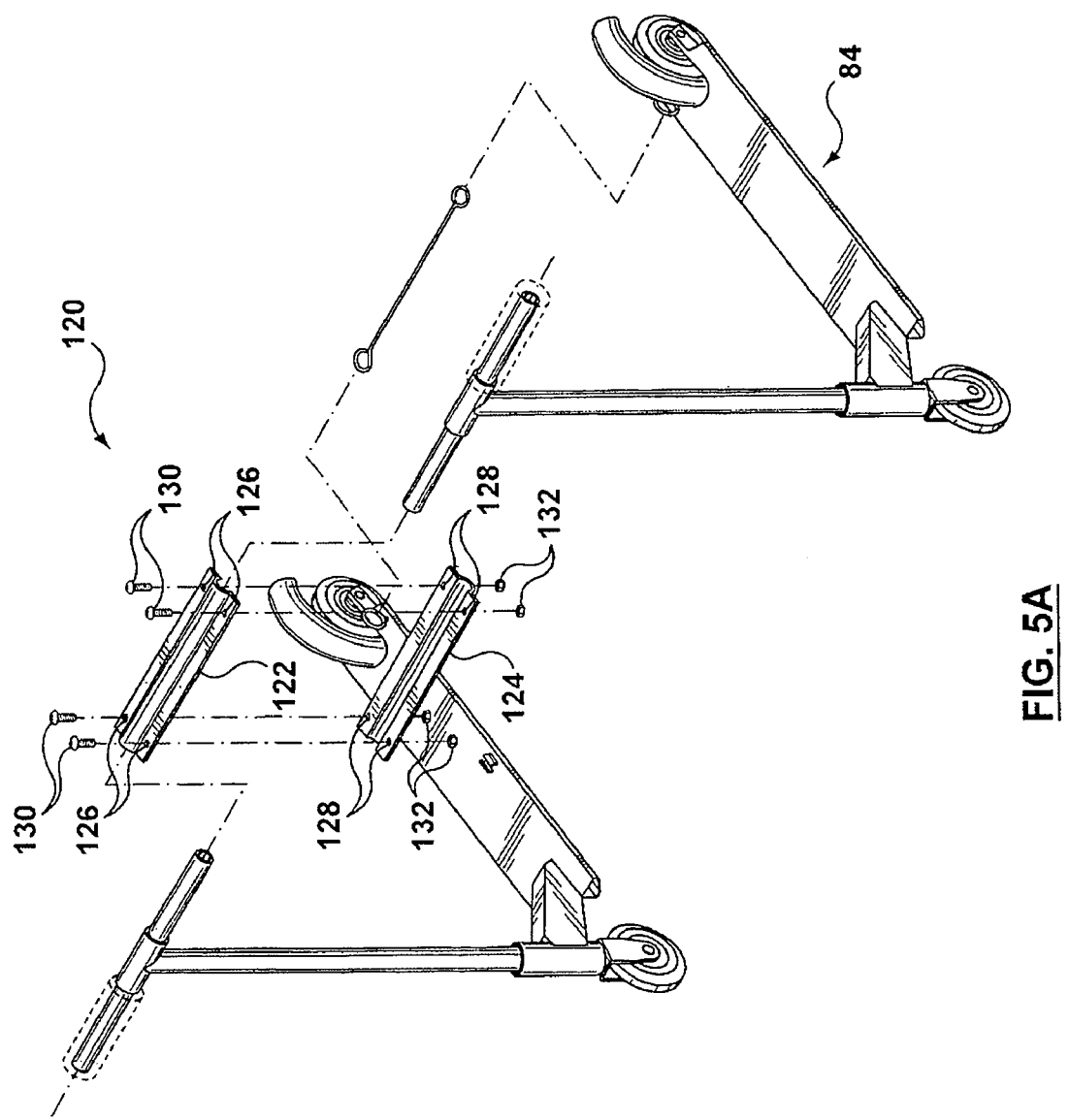
FIG. 5A shows an exploded isometric view of another wheeled vehicle system having another adapter in accordance with another example embodiment.
Figure 5B:
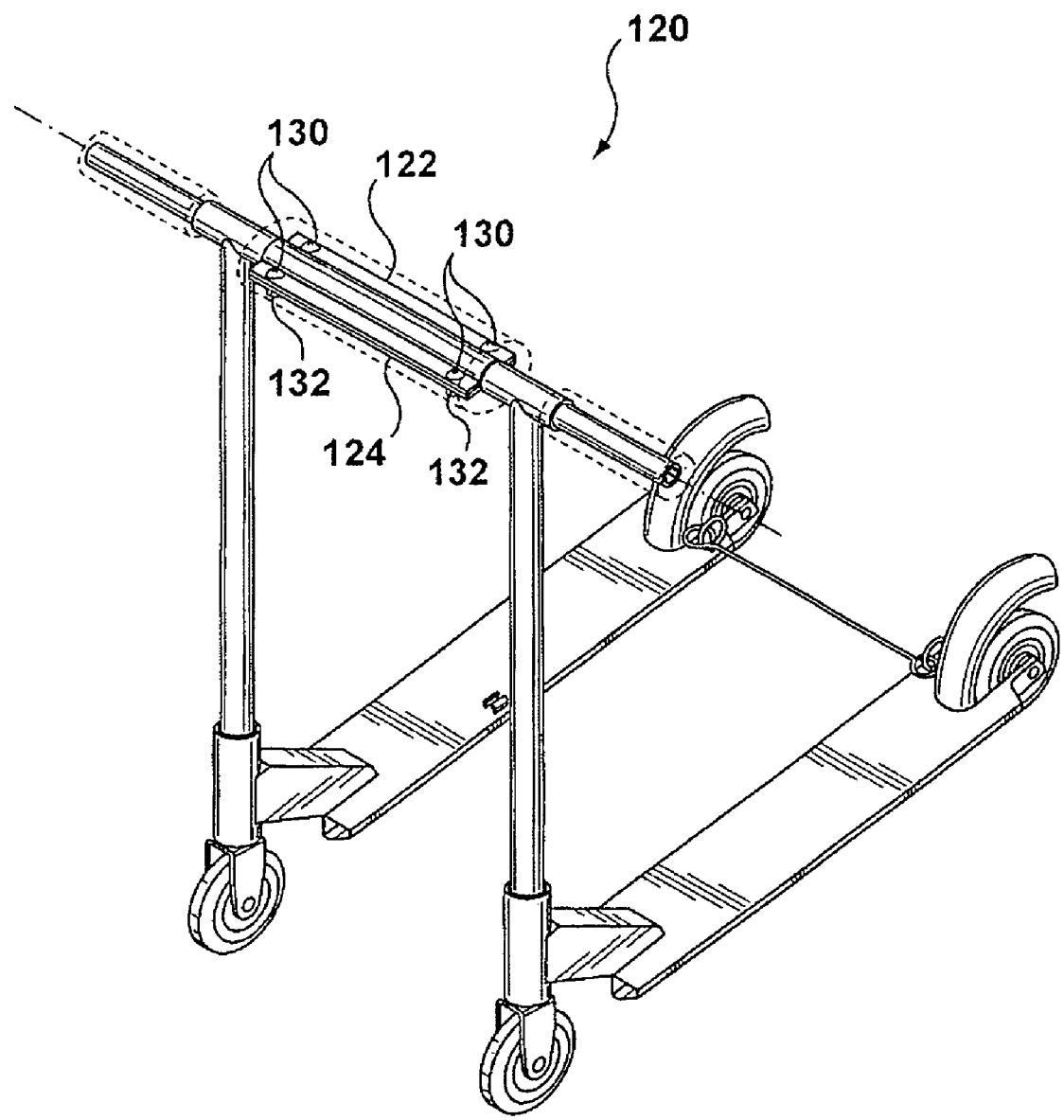
FIG. 5B shows an assembled isometric view of the wheeled vehicle system of FIG. 5A.

Reference is now made to FIGS. 5A and 5B, which shows another wheeled vehicle system having another adapter system 120 in accordance with another example embodiment. The adapter system 120 includes a split collar having an upper semi-cylindrical portion 122 and a lower semi-cylindrical portion 124. The upper semi-cylindrical portion 122 includes holes 126 which generally correspond to holes 128 defined in the lower semi-cylindrical portion 124. The adapter system 120 may include bolts 130 which extend through the holes 126, 128, and are secured via nuts 132. The split collar configuration provides sufficient pressure and friction to maintain a fixed connection between the handle members of the scooter vehicles. It can be appreciated that existing scooters can be used for this embodiment since holes are not required to be drilled into the handle members of the scooter vehicles.

Figure 6:
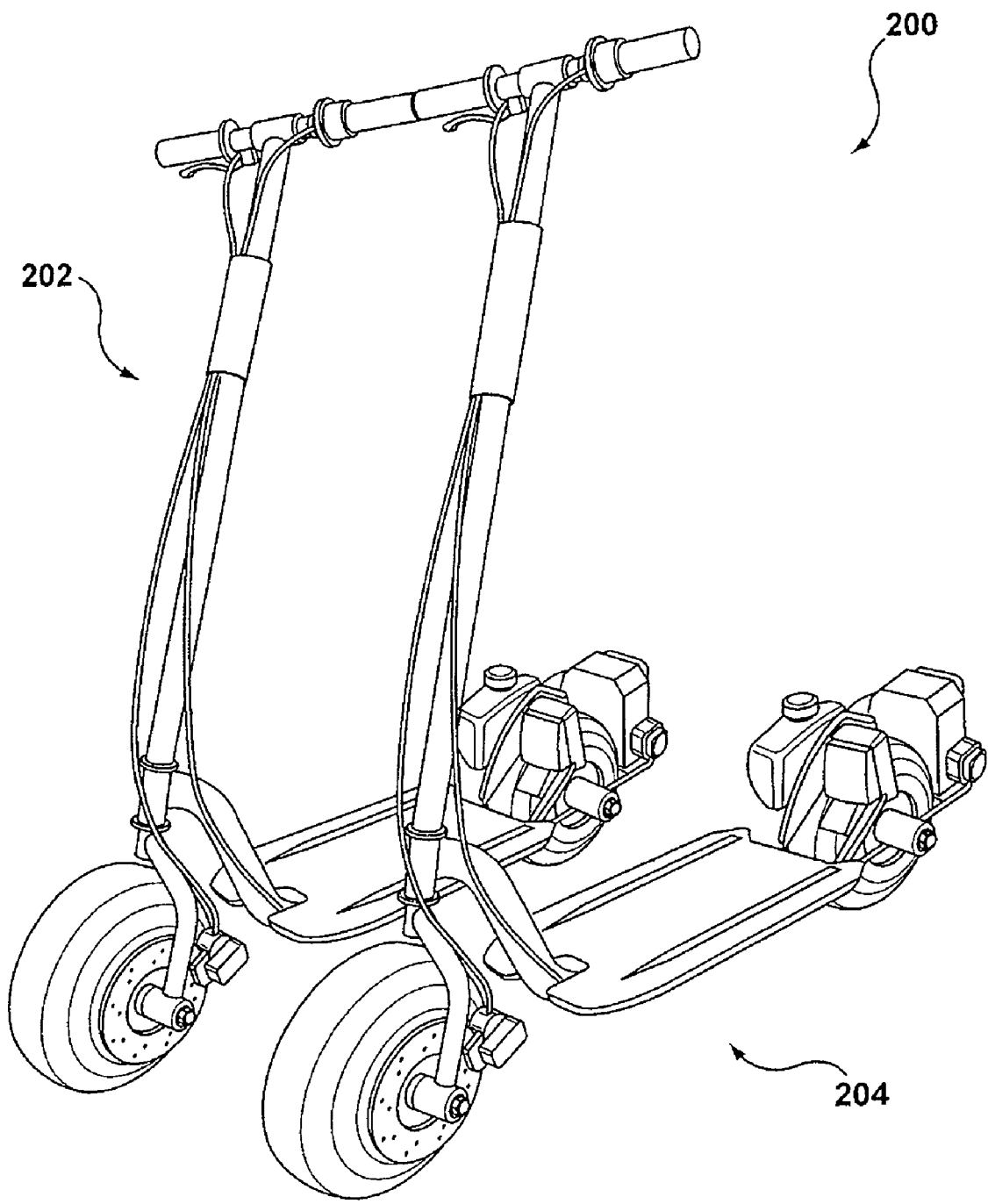
FIG. 6 shows an isometric view of a gas-powered wheeled vehicle system in accordance with another example embodiment.

Reference is now made to FIG. 6, which shows a gas-powered wheeled vehicle system 200 in accordance with another example embodiment. As shown, first gas-powered wheeled vehicle 202 is connected to the second gas-powered wheeled vehicle 204 at the handle members. Each wheeled vehicle 202, 204 is individually operable when separated. It can be appreciated that only one of the vehicles 202, 204 requires a motor for operation of the system 200. Each vehicle 202, 204 can be provided with its own hand operated brake system as shown and with its own drive motor mounted behind its rear wheel.

Figure 7:
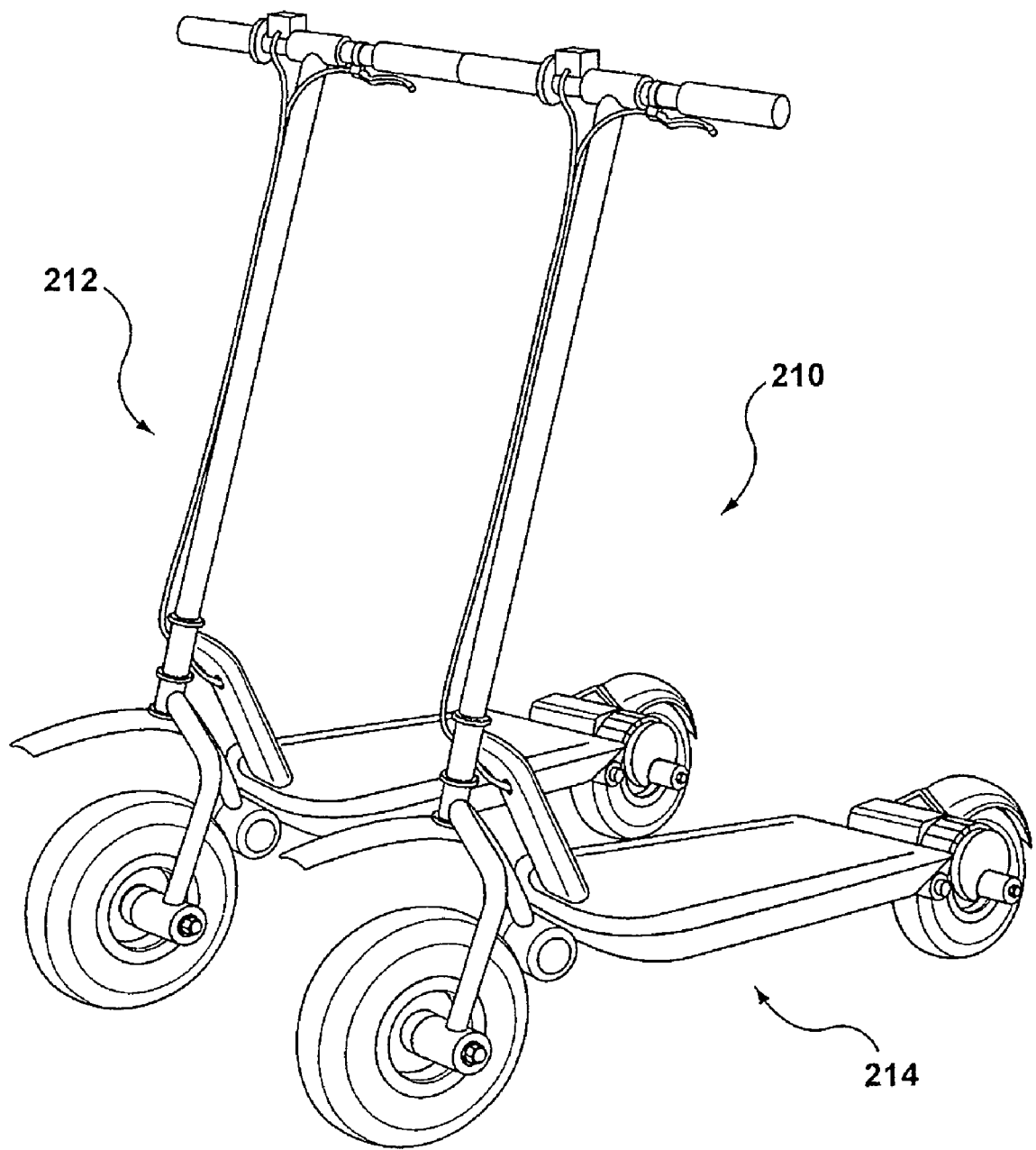
FIG. 7 shows an isometric view of an electric-powered wheeled vehicle system in accordance with another example embodiment.

Similarly, FIG. 7 shows an electric-powered wheeled vehicle system 210 in accordance with another example embodiment. First electric-powered wheeled vehicle 212 is fixedly connected to the second electric-powered wheeled vehicle 214 at the handle members, in a manner similar to that described above.

While example embodiments have been described with respect to first and second wheeled vehicles, additional wheeled vehicles may be connected or cascaded, for example thereby allowing multiple users. Various combinations of gas-powered, electric-powered, and manually operated vehicles can be used.

In some example embodiments, the wheeled vehicle systems are not limited to scooter-like vehicles which have been described in detail. Rather, in some example embodiments the wheeled vehicle systems could be adapted for other vehicles having a rear wheel and a steerable front wheel rotatably mounted in a common plane, for example bicycles, motorcycles, mopeds, and toys representing same. For instance, the described wheeled vehicle system can be constructed so that each vehicle is a scale model of a standard sized scooter. An example of such a system can have each vehicle constructed with dimensions $1/10^{th}$ those of a standard vehicle.

In other example embodiments, the handle members of conventional jet skis may be connected for operation on a water surface.

While the invention has been described in detail in the foregoing specification, it will be understood by those skilled in the art that variations may be made without departing from the scope of the invention.

What is claimed is:

1. A vehicle system, comprising:
    a first vehicle having a first vehicle frame, a first front support mechanism pivotally mounted on the first vehicle frame, a first elongate steering member extending generally upwardly from the first vehicle frame for pivoting the first front support mechanism, the first elongate steering member defining a first axis of rotation and pivotal about said first axis of rotation in order to steer the first vehicle, and a first handle member extending transversely from the first elongate steering member for pivoting the first elongate steering member about said first axis of rotation;
    a second vehicle having a second vehicle frame, a second front support mechanism pivotally mounted on the second vehicle frame, a second elongate steering member extending generally upwardly from the second vehicle frame for pivoting the second front support mechanism, the second elongate steering member defining a second axis of rotation and pivotal about said second axis of rotation, and a second handle member extending transversely from the second elongate steering member for pivoting the second elongate steering member about said second axis of rotation; and
    a connecting member having one end pivotally connected to the first vehicle frame of the first vehicle and another end pivotally connected to the second vehicle frame of the second vehicle,
    wherein the first handle member of the first vehicle is fixedly connected to the second handle member of the second vehicle so that, during use of the two vehicles together, they are able to be moved and to be steered together.

2. A first wheeled vehicle for connection to a second similar wheeled vehicle for operation on a ground surface, the first wheeled vehicle comprising:
    a main vehicle frame, a rear wheel and a front wheel pivotally mounted in a common plane on the main vehicle frame to contact the ground surface, an elongate steering member extending generally upwardly from the main vehicle frame for pivoting the front wheel, the elongate steering member defining an axis of rotation and pivotal about said axis of rotation in order to steer the first vehicle, a first handle member extending transversely from the elongate steering member for pivoting the elongate steering member about said axis of rotation;
    a connecting device for rigidly connecting said first handle member to an end section of a second handle member of the second similar wheeled vehicle so that the first and second handle members are axially aligned with one another; and
    a connecting member having one end adapted for pivotal connection to the main vehicle frame of the first wheeled vehicle and an opposite end adapted for pivotal connection to a second main vehicle frame of the second wheeled vehicle,
    wherein during use of the first and second wheeled vehicles together, they are connected to each other by said connecting device and they are able to move and to be steered together.

3. A wheeled vehicle system for operation on a ground surface, comprising:
    a first wheeled vehicle having a first vehicle frame, a first rear wheel and a first front wheel pivotally mounted in a first common plane on the first vehicle frame to contact the ground surface, a first elongate steering member extending generally upwardly from the first vehicle frame for pivoting the first front wheel, the first elongate steering member defining a first axis of rotation and pivotal about said first axis of rotation, a substantially elongate first handle member extending transversely from the first elongate steering member for pivoting the first elongate steering member about said first axis of rotation;
    a second wheeled vehicle having a second vehicle frame, a second rear wheel and a second front wheel pivotally mounted in a second common plane on the second vehicle frame to contact the ground surface, a second elongate steering member extending generally upwardly from the second vehicle frame for pivoting the second front wheel, the second elongate steering member defining a second axis of rotation and pivotal about said second axis of rotation, a second substantially elongate handle member extending transversely from the second elongate steering member for pivoting the second elongate steering member about said second axis of rotation; and
    a connecting adapter,
    wherein one end of the first handle member of the first wheeled vehicle is fixedly connected to an adjacent end of the second handle member of the second wheeled vehicle by said connecting adapter in order that the two handle members can be operated in unison to steer the vehicle system.

4. The wheeled vehicle system of claim 3, wherein the first handle member and the second handle member define a common axis.

5. The wheeled vehicle system of claim 3, wherein said connecting adapter is a rigid adapter having first and second ends, the first end being fixedly connected to the first handle member and the second end being fixedly connected to the second handle member.

6. The wheeled vehicle system of claim 3, further comprising an elongate connecting member having one end connected to the first vehicle frame of the first wheeled vehicle and another end connected to the second vehicle frame of the second wheeled vehicle.

7. The wheeled vehicle system of claim 6, wherein the connecting member is rigid, said one end of the connecting member is pivotally connected to the first vehicle frame, and the other end is pivotally connected to the second vehicle frame.

8. The wheeled vehicle system of claim 3, wherein each of the first and second wheeled vehicles are individually operable when separated.

9. The wheeled vehicle system of claim 3, wherein each vehicle frame of the first and second wheeled vehicles includes a generally horizontal footboard for supporting a user of the vehicle system during use of the vehicle system.

10. The wheeled vehicle system of claim 3, further comprising at least one further wheeled vehicle generally similar to the first wheeled vehicle, the or each further vehicle have a further handle member fixedly connected to the handle member of the first wheeled vehicle or the handle member of the second wheeled vehicle.

11. The wheeled vehicle system of claim 5, wherein the rigid adapter is generally elongate and tubular.

12. The wheeled vehicle system of claim 5, wherein the rigid adapter, the first handle member of the first wheeled vehicle, and the second handle member of the second wheeled vehicle are aligned with one another so as to define a common axis.

13. A wheeled vehicle system according to claim 3 wherein each of said wheeled vehicles is a push-type scooter and each of said first and second vehicle frames comprises a generally horizontal footboard.

14. A wheeled vehicle system according to claim 3 wherein at least one of said wheeled vehicles is a gas powered scooter having a gasoline engine mounted thereon to drive at least one of the front wheel and the rear wheel of said at least one vehicle and each of said first and second vehicle frames comprises a generally horizontal board for supporting a user's foot or feet.

15. A wheeled vehicle system according to claim 3 wherein at least one of said wheeled vehicles is an electric powered scooter having an electric motor mounted thereon to drive at least one of the wheels of the at least one vehicle and each of the first and second vehicle frames comprises a generally horizontal board for supporting a user's foot or feet.

16. A wheeled vehicle system according to claim 3 wherein each of said wheeled vehicles is a scale model of a scooter.

* * * * *